UNITED STATES PATENT OFFICE.

JOHN B. NEWBROUGH, OF NEW YORK, N. Y.

IMPROVEMENT IN THE MANUFACTURE OF HARD RUBBER.

Specification forming part of Letters Patent No. 100,435, dated March 1, 1870.

*To all whom it may concern:*

Be it known that I, JOHN B. NEWBROUGH, of New York, county of New York, State of New York, have invented an Improvement in the Production of Articles from Caoutchouc and other materials, of which the following is a specification:

My invention consists of a certain material, fully described hereinafter, for combining with caoutchouc, &c., to produce compositions which will harden on the application of heat.

My invention further consists in the manufacture of articles of utility and ornament by the use of said material, and also of articles so produced.

A hardening material, which I designate "acid resin," is produced as follows: Two parts, by measure, of turpentine, are poured into an open vessel containing one part of sulphuric acid, and the two are thoroughly combined by stirring the mixture. The vessel is then placed in a water-bath and heated until its contents boil, (care being taken to prevent the ignition of the turpentine,) and after the boiling has continued one or two minutes an apparent effervescence of the liquid will subside. The mixture is then cooled, when it will be of about the consistency of honey, and ready for use. Should the boiling be continued for a little longer time the product will be brittle and pulverulent.

While the turpentine and acid are combining, a light-colored vapor and a gas, having a strong sulphurous smell, arise from the same, and the boiling should be continued at a low temperature until such vapor and gas cease to be evolved. Should the sulphureous gas not be driven off, the product, or acid resin, will act on gums and oils by the process of dehydrogenation; but when prepared as above described, the acid resin becomes compatible with all the hydrocarbons. The acid resin will be either gelatinous or hard, according to the length of time for which the acid and turpentine are boiled; but whether gelatinous or hard it has the power, like sulphur, iodine, and bromine, of converting caoutchouc, gutta-percha, and similar gums into a hard solid substance.

One part, by measure, of sulphuric acid, and four of turpentine will produce the required acid resin by boiling for a longer time than when less turpentine is used; and one part, by measure, of sulphuric acid to two of benzole (or turpentine, in which one-fourth, by weight, of common resin or asphaltum has been dissolved,) will also produce the acid resin, but of an inferior quality. Nitric acid and muriatic acid may be substituted for sulphuric acid, but they are not so good.

In making a hard material six ounces of the acid resin are added to one pound of caoutchouc, and thoroughly incorporated therewith, and the mixture is molded or pressed into any desired shape, and subjected to dry heat for about an hour or more, the temperature being about 320° Fahrenheit. The curing may be effected at 300°, or it may be carried as high as 360°.

One or two ounces of acid resin may be used for each pound of gum when a very hard product is not required; although even one or more pounds of the acid resin will combine with one pound of gum if care is taken to employ a lower degree of heat in the curing process.

Equal parts, by weight, of the acid resin and linseed or rape-seed oil form an excellent composition, which hardens on being subjected to a gradually-increasing heat, from 230° to 300° Fahrenheit, for about two hours.

The acid resin will combine in any proportion with sulphur, iodine, bromine, or phosphorus, and, in such combination with all resinous gums, and produce a hardened compound.

I claim—

1. The within-described material or substance, consisting of sulphuric or other acid, in combination with benzole or turpentine, or other resinous spirit or oil.

2. The manufacture of articles of utility or ornament by subjecting to the action of heat a mixture of the said material and caoutchouc or other substance on which a like effect can be produced.

3. Articles of utility and ornament, consisting, in whole or in part of the product resulting from the combination of the said material and caoutchouc, linseed-oil, or other substance, substantially as described.

In testimony whereof I have signed my name to this specification in the presence of two subscribing witnesses.

J. B. NEWBROUGH.

Witnesses:
O. D. ROBERTS,
H. RITTER.